April 30, 1968  F. LANDBRECHT  3,380,359

CAMERA FOR SYNCHRO-FLASH PHOTOGRAPHY

Filed Dec. 9, 1965  2 Sheets-Sheet 1

INVENTOR.
FRANZ LANDBRECHT
BY
Michael J. Striker
Atty

April 30, 1968  F. LANDBRECHT  3,380,359
CAMERA FOR SYNCHRO-FLASH PHOTOGRAPHY
Filed Dec. 9, 1965  2 Sheets-Sheet 2
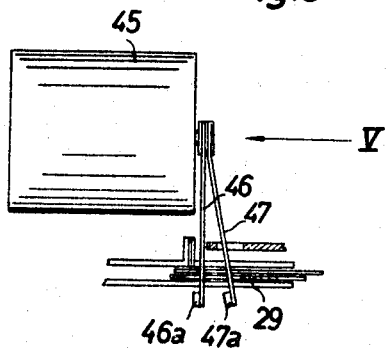
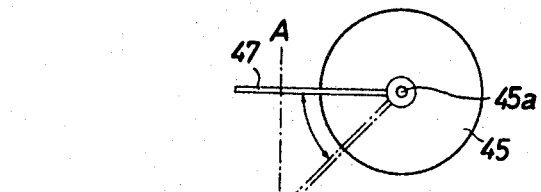
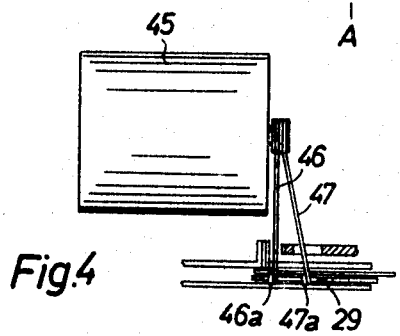
INVENTOR.
FRANZ LANDBRECHT
BY
Michael J. Striker

United States Patent Office 3,380,359
Patented Apr. 30, 1968

3,380,359
CAMERA FOR SYNCHRO-FLASH
PHOTOGRAPHY
Franz Landbrecht, Unterhaching, Munich, Germany, assignor to Agfa-Gevaert Aktiengesellschaft, Leverkusen, Germany
Filed Dec. 9, 1965, Ser. No. 512,623
Claims priority, application Germany, Dec. 17, 1964, A 47,912
10 Claims. (Cl. 95—11.5)

The present invention relates to photographic cameras in general, and more particularly to cameras for synchro-flash photography. Still more particularly, the invention relates to an improved synchronizer system between the flash unit and the diaphragm of a photographic camera.

In cameras with so-called diaphragm shutters, proper synchronization of the diaphragm with the flash unit is of upmost important. In other words, the blades of the diaphragm should define an opening of optimum maximum size for a particular exposure at the exact moment when the curve which indicates the intensity of artificially produced light reaches a maximum value, i.e., the intensity of artificially produced light should reach its peak value at the very moment when the blades of the shutter are about to begin with a reduction in the size of the diaphragm opening.

Accordingly, it is an important object of my present invention to provide a camera for synchro-flash photography which fully meets the above outlined requirements and wherein the operative connection between the flash unit and the diaphragm is of very simple, rugged and compact design.

Another object of the invention is to provide a novel synchronizer system between the diaphragm and the flash unit of a photographic camera.

A further object of my invention is to provide a camera wherein the interval between actual completion of the electric circuit in the flash unit and the exact moment when the size of the diaphragm opening assumes a maximum value for a particular exposure can be varied in a very simple manner.

An additional object of the invention is to provide a novel exposure meter for use in a camera of the above outlined characteristics.

A concomitant object of the invention is to provide a novel cocking mechanism for the diaphragm in a camera of the above outlined character.

Still another object of the invention is to provide a camera which can be rapidly converted for use with or without a flash unit, and wherein the circuit of the flash unit can be completed by elements at least some of which do not form part of the diaphragm and which can simultaneously perform one or more additional functions.

Briefly stated, one feature of my invention resides in the provision of a camera for synchro-flash photography wherein an exposure meter comprises a moving-coil instrument having a pair of electrically connected angularly movable current-conducting indicator needles with normally spaced end portions. The camera further comprises a diaphragm shutter including shutter means movable from normal uncocked position in which the diaphragm shutter is closed to a plurality of cocked positions each of which corresponds to a diaphragm opening of a different size, a current-conducting tracking portion provided on the shutter means and movable into engagement with one of the needles to thereby displace the end portion of such needle into engagement with the end portion of the other needle whereby the diaphragm defines an opening whose size is a function of the momentary angular position of the needles, a fixed current-conducting abutment for the other nedle, a flash unit including an electric circuit having a first terminal connected with the abutment and a second terminal connected with the tracking portion so that the circuit is completed through the needles when the tracking portion engages the one needle, and cocking means for moving the shutter means from uncocked position to thereby move the tracking portion first into engagement with the other needle to thereby complete the circuit of the flash unit and to thereupon move the tracking portion with the one needle until the end portion of the one needle engages the end portion of the other needle whereby the movement of the shutter means is terminated subsequent to completion of the circuit and in a cocked position which is a function of the angular position of the needles.

The angular position of the needles may be changed by the moving coil or by a manually operable selector.

The novel features which are considered as characteristic of the invention are set forth in particular in the appended claims. The improved camera itself, however, both as to its construction and the mode of manipulating the same, together with additional features and advantages thereof, will be best understood upon perusal of the following detailed description of certain specific embodiments with reference to the accompanying drawings, in which:

FIG. 3 is a fragmentary in part front elevational and in part sectional view of a modified camera;

FIG. 4 illustrates the structure of FIG. 3 with the needles of the moving-coil instrument in a different angular position; and FIG. 5 is an end elevational view of the moving-coil instrument as seen in the direction of the arrow V in FIG. 3.

Figure 1:
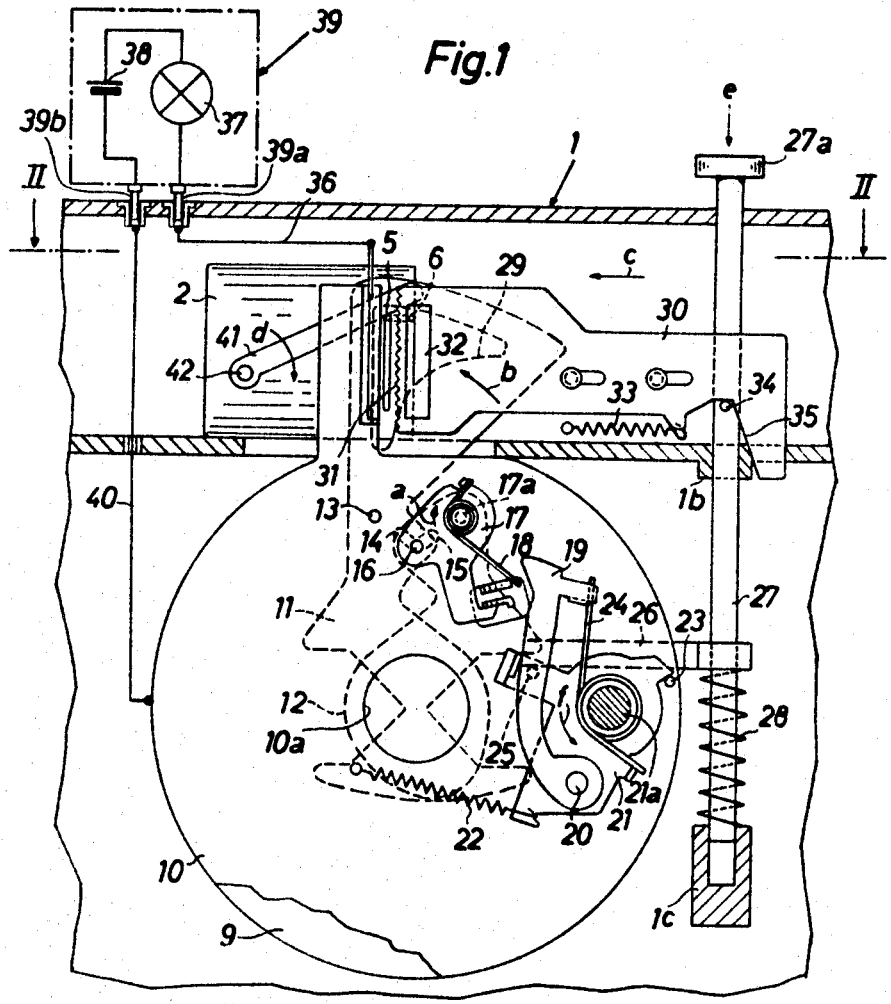
FIG. 1 is a diagrammatic front elevational view of a portion of a still camera which embodies my invention, certain parts of the housing being broken away.
Figure 2:
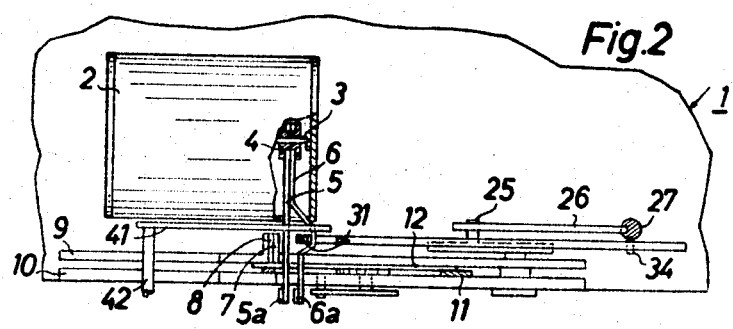
FIG. 2 is a horizontal section substantially as seen in the direction of arrows from the line II—II of FIG. 1.

Referring first to FIGS. 1 and 2, there is shown a portion of a still camera comprising a housing 1 which accommodates a built-in exposure meter having a moving-coil instrument 2. This instrument is connected in circuit with a conventional photosensitive resistor or cell (not shown) so that the angular position of the shaft 3 which forms part of the instrument 2 is a function of intensity of light coming from a viewed scene or subject and impinging against the photosensitive element. An adjustable auxiliary diaphragm (not shown) may be placed in front of the photosensitive element to calibrate the exposure meter by taking into consideration the sensitivity of film in the housing 1. The shaft 3 of the instrument 2 is connected with the moving coil and carries a composite indicator unit including two current-conducting pointers or needles 5 and 6. The connection between the needles 5, 6 and the shaft 3 comprises a disk 4 consisting of insulating material. Such portions of the needles 5, 6 which are nearer to the shaft 3 are electrically connected with each other. These needles are located in a common plane which includes the axis of the shaft 3 and are movable in front of a fixed abutment or anvil 7. This abutment 7 also consists of current-conducting material and is secured to a first plate-like support 9 by interposition of an insulator 8, see FIG. 2. The support 9 is parallel with a second plate-like support 10. The space between the supports 9, 10 accommodates a diaphragm shutter including two sector-shaped diaphragm blades 11 and 12 which are movable in opposite directions and are rockable on a common pivot pin 13 carried by the support 10. The blades 11, 12 are respectively provided with slots 14, 15 for a common pin 16 provided on a cocking lever 17. This cocking lever 17 is biased by a torsion spring 18 and can be rocked about a shaft 17a by means of a propelling member 19 which is rockable about a shaft 20 carried by an intermediate lever 21. The direction in which the cocking lever 17 may be rocked by the propelling member 19 is indicated by an arrow a. The intermediate lever 21 is biased by a helical spring 22 which tends to maintain this lever in abutment with a fixed pin-shaped projection 23 of the housing 1. The means for biasing the propelling member 19 with reference to the intermediate lever 21 comprises a torsion spring 24 convoluted around a shaft 21a which serves as a fulcrum for the lever 21. The latter carries a pin-shaped projection 25 which abuts against an extension 26 of a reciprocable release trigger 27. This trigger 27 is biased by a helical return spring 28 which tends to maintain it in the starting position of FIG. 1. The operator may depress the head 27a of the trigger 27 (arrow e) to thereby rock the intermediate lever 21 in a counterclockwise direction (arrow f) through the intermediary of the extension 26 and against the bias of the springs 22, 28. In the illustrated embodiment, the release trigger 27 is reciprocable in a straight path and is guided in suitable bearings 1b, 1c forming part of or secured to the housing 1.

At least the diaphragm blade 11 consists of current-conducting material and is integral with a metallic tracking element 29 which can cooperate with the abutment 7 to clamp the needles 5 (and hence also the needle 6) against angular movement. The tracking element 29 is movable about the pivot pin 13 (arrow b) in response to shifting of a slidable arresting member 30 which can receive motion from the release trigger 27 to advance in a direction counter to that indicated by an arrow c. This arresting member 30 is formed with a toothed, serrated or otherwise roughened locking face 31 which can engage the needle 5 to clamp it against the abutment 7. A slot 32 in the arresting member 30 accommodates the needle 6 in such a way that the latter can follow angular movements of the shaft 3 when the member 30 is held in retracted or idle position against the bias of a helical spring 33. The means for shifting the arresting member 30 against the bias of the spring 33 includes a follower pin 34 on the release trigger 27 and a suitably inclined cam face 35 on the member 30. Thus, when the head 27a of the trigger 27 is depressed (arrow e), the arresting member 30 moves in the direction of the arrow c because it is permanently biased by the spring 33. The bias of the spring 28 is stronger than the bias of the spring 33 so that, when the trigger 27 is released and returns to the starting position of FIG. 1, the arresting member 30 automatically returns to its retracted position and the spring 33 stores energy.

The abutment 7 is connected with one pole or terminal 39a of a flash unit 39 by means of a conductor 36. This flash unit includes a battery 38 or an analogous source of electrical energy and a lamp 37. The other pole or terminal 39b of the flash unit 39 is connected with a second conductor 40 which is soldered to the support 10. Thus, the conductor 40 is also connected with the diaphragm blade 11 because the latter is mounted on the pin 13 of the support 10. In the embodiment of FIGS. 1 and 2, the flash unit 39 is detachable from the housing 1; however, it is obvious that the unit 39 (or an analogous flash unit) can be permanently mounted in the camera.

The exposure system further includes a manually operable selector lever 41 which is secured to a shaft 42 and serves to determine the size of the diaphragm opening at the will of the operator. The shaft 42 is secured to a manually actuable lever (not shown) which can be grasped by hand to select the size of the diaphragm opening without relying on the angular position of the shaft 3. The lever 41 is rockable in or counter to the direction indicated by the arrow d. The free end of this lever 41 then entrains the needles 5 and 6 to hold them in a selected angular position corresponding to the desired size of the diaphragm opening, such as is necessary to make an exposure with flash.

In order to make an exposure in artificial light, and by manual selection of the exact size of the diaphragm opening, the user will proceed as follows:

The selector lever 41 is moved in the direction of the arrow d until the needles 5, 6 assume a desired angular position. During such setting of the lever 41, the instrument 2 is preferably short-circuited in a manner known per se so that it cannot influence the angular position of the needles. In the next stop, the user depresses the head 27a of the release trigger 27 (arrow e) so that the follower pin 34 moves away from the cam face 35 and the spring 33 is free to entrain the arresting member 30 (arrow c) whereby the needle 5 is engaged by the roughened face 31 and is held against the fixed abutment 7. As the trigger 27 continues to move in the direction of the arrow e, the extension 26 rocks the intermediate lever 21 through the intermediary of the pin 25 and against the bias of the springs 28, 22 through such an angle (arrow f) that the propelling member 19 also moves in the direction of the arrow f and propels the cocking lever 17 in the direction of the arrow a whereby the pin 16 effects that the diaphragm blades 11, 12 rotate in opposite directions and define a diaphragm opening for entry of light rays. Such rotation of the blades 11, 12 from their normal uncocked position is terminated when the suitably configurated tracking face of the tracking element 29 engages the needle 6 and presses the end portion 6a of this needle against the end portion 5a of the needle 5. The blades 11, 12 thereupon begin to move back to uncocked position under the bias of the spring 18 which is coupled with the cocking lever 17 so that the size of the diaphragm opening is rapidly reduced to zero. Thus, each size of the diaphragm opening corresponds to a predetermined exposure time, and the duration of such exposure time increases if the size of the diaphragm opening is larger.

When the tracking face of the tracking element 29 reaches the needle 6, the circuit of the flash unit 39 is completed through the abutment 7, needle 5, needle 6, tracking element 29, blade 11 and support 10. The interval between the moment when the tracking element 29 reaches the needle 6 (completion of the circuit) and the moment when the tracking face of the element 29 moves the end portion 6a of the needle 6 into actual contact with the end portion 5a of the needle 5 depends on the normal positioning of the end portions 5a, 6a with reference to each other and is selected in such a way that the intensity of light produced by the lamp 37 reaches a maximum value when the diaphragm blades 11, 12 begin to move from their selected cocked position under the bias of the spring 18 to reduce the size of the diaphragm opening.

When the head 27a is released, the trigger 27 follows the bias of the spring 28 and returns to the starting position of FIG. 1. The follower 34 engages the cam face 35 and retracts the arresting member 30 against the bias of the spring 33 so that the needles 5, 6 are released. The parts 17, 19 and 21 automatically return to their starting positions and the camera is ready for the next exposure.

The short interval between the moment when the tracking face of the element 29 engages the needle 6 and the moment when the end portion 6a reaches the end portion 5a suffices for the light intensity curve to reach its peak value. During this interval, the size of the diaphragm opening continues to increase, i.e., the reduction in the size of the diaphragm opening begins when the needle 6 is arrested by the needle 5. At this very moment, the propelling member 19 bypasses the cocking lever 17 so that the latter immediately closes the diaphragm under the action of the spring 18.

The supports 9, 10 are provided with registering apertures 10a whose size at least equals the maximum size of the diapgram opening. The apertures 10a register with such diaphragm opening.

For automatically selecting the size of the diaphragm opening, the user shifts the selector lever 41 to an inoperative position so that the needles 5, 6 may be adjusted by the moving coil of the instrument 2. The user then detaches the flash unit 39 and depresses the trigger head 27a to make an exposure in a manner as described above. The flash unit 39 may be provided with a master switch which is opened when the exposure is to be taken without flash so that the unit 39 need not be detached at all.

The needle 5 serves as an abutment for the needle 6 and the abutment 7 is in current-conducting contact with the needle 5, not later than at the time when the needle 6 is engaged by the tracking face of the element 29. This insures that the circuit of the flash unit is completed as soon as the needle 6 is engaged by the tracking element 29. When the blades 11, 12 return to their uncocked position to close the diaphragm, the needle 5 is free to move relative to the abutment 7 so that it can readily assume an angular position which is determined by the selector lever 41 or by the intensity of light which causes the shaft 3 to move the needles 5 and 6. It is clear that the camera may be provided with a graduated scale which enables the operator to rock the selector lever 41 to its idle position or to a different position in which the angular position of the needles corresponds to a diaphgram opening of selected size.

In order to be capable of changing the duration of "preignition" of the lamp 37 in response to changes in the size of the diaphragm opening the shaft 45a of the moving-coil instrument 45 shown in FIGS. 3–5 carries two indicator needles 46, 37 which make an acute angle with each other. When the needles 46, 37 assume the angular position of FIG. 3 (shown by solid lines in FIG. 5), the tracking element 29 must cover a relatively short distance in order to move the end portion 47a into actual abutment with the end portion 46a. Thus, the interval between actual completion of the circuit of the lamp 37 (on contact of the tracking element 29 with the needle 47) and the moment (engagement between end portions 46a, 47a) when the diaphragm opening reaches its maximum size is relatively short.

In FIG. 4, the needles 46, 47 are moved to a different angular position (shown in FIG. 5 by phantom lines) in which the aforesaid interval is longer, i.e., the duration of preignition is longer. The length of such interval preferably increases when the needles 46, 47 are moved from the one to the other end position. The line A—A indicates in FIG. 5 the plane in which the tracking element 29 can move in directions at right angles to the plane of FIGS. 3 to 5.

It is clear that the improved camera is susceptible of many modifications without departing from the spirit of my invention. For example, the camera may be provided with a different diaphragm. Also, the needles 46, 47 need not be inclined with reference to each other all the way from the shafts 45a and to the end portions 46a, 47a so that the needle 47 will be moved toward the needle 46 only when the two needles are held within a certain zone of their range of movement with the shaft 45a. The selector lever 41 may be replaced by other suitable means for manually determining the exact size of the diaphragm opening. For example, the instrument 2 or 45 may be connected in circuit with a battery and with a variable resistor which is adjustable by hand to thereby change the angular position of the needles 5, 6 or 46, 47.

The arresting member 30 preferably consists of insulating plastic material or is insulated from the circuit of the flash unit 39.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera for synchro-flash photography, an exposure meter including a pair of interconnected movable current-conducting indicators having normally spaced portions; a diaphragm shutter including shutter means movable from a normal uncocked position in which the diaphragm shutter is closed to a plurality of cocked positions each of which corresponds to a diaphragm opening of a different size, said shutter means having a current-conducting tracking portion movable into engagement with one of said indicators to thereby displace the portion of said one indicator into engagement with the portion of the other indicator; a fixed current-conducting abutment for said other indicator; a flash unit including an electric circuit having a first terminal connected with said tracking portion and a second terminal connected with said abutment so that said circuit is completed through said indicators when the tracking portion engages said one indicator; and cocking means for moving said shutter means to a cocked position to thereby move said tracking portion first into engagement with said one indicator to complete said circuit and to thereupon move said tracking portion with said one indicator until the portion of said one indicator abuts against the portion of the other indicator whereby the movement of said shutter means is terminated subsequent to completion of said circuit and in a cocked position in which the size of said opening is a function of the angular position of said indicators.

2. A structure as set forth in claim 1, wherein said cocking means comprises a release trigger movable to and from a starting position, and further comprising arresting means operatively connected with and displaceable by said trigger when the latter is moved from starting position to thereby clamp said other indicator against said abutment.

3. A structure as set forth in claim 1, wherein at least a part of one of said indicators normally makes an acute angle with the other indicator.

4. A structure as set forth in claim 1, wherein said tracking portion comprises a tracking face whose inclination with reference to the path of angular movement of said indicators is such that the length of intervals between engagement of said tracking portion with said one indicator and engagement of said indicator portions varies in response to changes in angular position of said indicators.

5. A structure as set forth in claim 1, where further comprising manually operable selector means for changing the angular position of said indicators.

6. A structure as set forth in claim 1, wherein said cocking means comprises a release trigger reciprocable to and from a starting position, and further comprising arresting means operatively connected with said trigger and shiftable in response to movement of said trigger from starting position to thereby clamp said other indicator against said abutment.

7. A structure as set forth in claim 1, wherein said exposure meter further includes a moving-coil instrument having a rotary shaft whose angular position is a function of the intensity of light coming from a viewed scene or subject and wherein said indicators are needles secured to but insulated from said shaft and located in a plane which includes the axis of said shaft.

8. A structure as set forth in claim 7, further comprising support means consisting of current-conducting material and carrying said diaphragm in such a way that the current may flow from said tracking portion to said support means, said circuit further comprising first conductor means connecting said first terminal with said support means and second conductor means connecting said second terminal with said abutment.

9. A structure as set forth in claim 8, further comprising a housing for said diaphragm shutter and for said flash unit, said flash unit being detachable from said housing.

10. A structure as set forth in claim 1, wherein said shutter means comprises a pair of blades movable in opposite directions and further comprising resilient means for permanently biasing said blades to said uncocked position, said cocking means being arranged to bypass said blades on movement of said one indicator portion into engagement with said other indicator portion so that said resilient means is free to return the blades to uncocked position.

References Cited
UNITED STATES PATENTS

| | | | |
|---|---|---|---|
| 3,139,805 | 7/1964 | Peterson | 95—11.5 |
| 3,171,337 | 2/1965 | Fischer | 95—11.5 |
| 3,250,193 | 5/1966 | Horton | 95—10 |

NORTON ANSHER, *Primary Examiner.*

FRED L. BRAUN, *Assistant Examiner.*